(12) United States Patent
Kwon (10) Patent No.: US 8,582,545 B2
(45) Date of Patent: Nov. 12, 2013

(54) METHOD AND APPARATUS PREVENTING PLURALITY OF STATIONS IN WLAN FROM COLLIDING WITH EACH OTHER WHEN ATTEMPTING TO ACCESS MEDIUM

(75) Inventor: Chang-Yeul Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/210,144

(22) Filed: Aug. 15, 2011

(65) Prior Publication Data

US 2011/0299516 A1 Dec. 8, 2011

Related U.S. Application Data

(63) Continuation of application No. 11/603,051, filed on Nov. 22, 2006, now Pat. No. 8,023,480.

(60) Provisional application No. 60/749,620, filed on Dec. 13, 2005.

(30) Foreign Application Priority Data

Apr. 10, 2006 (KR) ........................ 10-2006-0032407

(51) Int. Cl.
*H04W 4/00* (2009.01)
(52) U.S. Cl.
USPC .......... 370/338; 370/341; 370/345; 455/41.2; 455/450; 455/452.2
(58) Field of Classification Search
USPC ........................ 370/338, 329, 445, 294, 449; 455/450–452.2
See application file for complete search history.

(56) References Cited

U.S. PATENT DOCUMENTS

| | | |
|---|---|---|
| 6,799,054 B2 | 9/2004 | Shpak |
| 7,233,602 B2 | 6/2007 | Chen et al. |
| 7,379,447 B2 * | 5/2008 | Dunagan et al. ............... 370/350 |

(Continued)

FOREIGN PATENT DOCUMENTS

KR 1020050077006 A 7/2005

OTHER PUBLICATIONS

"Information technology—Telecommunications and information exchange between systems—Local and metropolitan area networks—Specific requirements—Part 11: Wireless LAN Medium Access Control (MAC) and Physical Layer (PHY) Specifications", Ansi/IEEE Std 802.11, 1999 Edition, total pp. 528.

(Continued)

*Primary Examiner* — Sharad Rampuria
(74) *Attorney, Agent, or Firm* — Sughrue Mion, PLLC (57) ABSTRACT

A method and apparatus for preventing a plurality of stations in a wireless local area network (WLAN) from colliding with each other when accessing a medium are provided. In the method, an access point (AP) determines the transmission capabilities of a plurality of stations in a basic service set (BSS) of the AP, determines the format of control frames or data frames which have a high throughput (HT) format to be used in the BSS of the AP, and notifies the stations of the result of the determination. Therefore, it is possible to adaptively choose and use an optimum method of preventing a plurality of stations in a WLAN from colliding with each other when accessing a medium according to the circumstances in a WLAN by referencing the transmission capabilities of a plurality of stations in the WLAN.

12 Claims, 10 Drawing Sheets

(56) References Cited

U.S. PATENT DOCUMENTS

| | | | |
|---|---|---|---|
| 7,408,909 | B2 | 8/2008 | Trainin et al. |
| 7,447,185 | B2 | 11/2008 | Trainin |
| 7,539,498 | B2 | 5/2009 | Dacosta et al. |
| 7,577,438 | B2 | 8/2009 | Sammour et al. |
| 7,599,340 | B2 | 10/2009 | Chandra et al. |
| 7,676,236 | B2 | 3/2010 | Nanda et al. |
| 7,817,614 | B2 | 10/2010 | Yang et al. |
| 7,839,819 | B2 | 11/2010 | Kim |
| 7,843,819 | B1 | 11/2010 | Benveniste |
| 7,856,031 | B2* | 12/2010 | Kwon et al. ............ 370/461 |
| 7,881,275 | B1 | 2/2011 | Bagchi |
| 7,903,607 | B2 | 3/2011 | Utsunomiya et al. |
| 7,912,024 | B2 | 3/2011 | Trachewsky |
| 8,023,480 | B2* | 9/2011 | Kwon ............ 370/338 |
| 2003/0123405 | A1 | 7/2003 | del Prado et al. |
| 2005/0058151 | A1* | 3/2005 | Yeh ............ 370/445 |
| 2005/0135284 | A1* | 6/2005 | Nanda et al. ............ 370/294 |
| 2005/0135318 | A1* | 6/2005 | Walton et al. ............ 370/338 |
| 2005/0152328 | A1 | 7/2005 | Sadri et al. |
| 2006/0050742 | A1* | 3/2006 | Grandhi et al. ............ 370/506 |
| 2007/0110091 | A1 | 5/2007 | Kwon |
| 2007/0115882 | A1 | 5/2007 | Wentink |
| 2008/0013496 | A1 | 1/2008 | Dalmases et al. |
| 2010/0034183 | A1 | 2/2010 | Nandagopalan et al. |
| 2010/0061334 | A1 | 3/2010 | Gault et al. |

OTHER PUBLICATIONS

Korean Notice of Allowance dated Aug. 31, 2007 issued in counterpart Korean Application No. 10-2006-0032407.

"Draft Amendment to Standard [for] Information Technology-Telecommunications and information exchange between systems-Local and Metropolitan networks-Specific requirements-Part 11: Wireless LAN Medium Access Control (MAC) and Physical Layer (PHY) specifications: Enhancements for Higher Throughput", IEEE P802.11, Mar. 2006, total pp. 335.

* cited by examiner

METHOD AND APPARATUS PREVENTING PLURALITY OF STATIONS IN WLAN FROM COLLIDING WITH EACH OTHER WHEN ATTEMPTING TO ACCESS MEDIUM

CROSS-REFERENCE TO RELATED PATENT APPLICATION

This application is a continuation of U.S. application Ser. No. 11/603,051 filed on Nov. 22, 2006, which claims priority from U.S. Provisional Application No. 60/749,620 filed on Dec. 13, 2005 in the U.S. Patent & Trademark Office, and Korean Patent Application No. 10-2006-0032407 filed Apr. 10, 2006 in the Korean Intellectual Property Office, the disclosures of which are incorporated herein in their entirety by reference.

BACKGROUND OF THE INVENTION

1. Field of the Invention

Methods and apparatuses consistent with the present invention relate to a wireless local area network (WLAN) which includes a plurality of stations, and more particularly, to preventing a plurality of stations in a WLAN from colliding with each other when attempting to access a medium.

2. Description of the Related Art

In a WLAN, Carrier Sense Multiple Access with Collision Avoidance (CSMA/CA)-based Medium Access Control (MAC) methods are widely used. CSMA/CA is a type of data transmission method in which, even when no data is currently being transmitted via a network cable, a signal for determining whether data is currently being transmitted via the network cable is transmitted and data is transmitted only after the signal is determined to have been successfully transmitted without collision.

According to CSMA/CA, a first station detects a sub-carrier which indicates whether a station is currently transmitting data. If a station is currently transmitting data, the first station stands by for a predetermined amount of time, determines whether a sub-carrier is being transmitted by another station, and begins to transmit data if a sub-carrier is not currently being transmitted.

According to CSMA/CA, both a physical carrier sensing method and a virtual carrier sensing method are used simultaneously. The physical carrier sensing method is a carrier sensing method in which a physical layer (PHY) determines whether a power of higher than a predefined value has been received and notifies an MAC layer whether a medium is currently busy or idle based on the results of the determination, and the virtual carrier sensing method is a carrier sensing method in which, if an MAC protocol data unit (MPDU) can be properly extracted from a received Physical Layer Convergence Procedure (PLCP) protocol data unit (PPDU), stations interpret one of a plurality of header fields of the MPDU, i.e., a duration/identifier field of the MPDU, and determine whether a medium is currently busy based on the results of the interpretation. Stations use both the physical carrier sensing method and the virtual carrier sensing method to determine whether a medium is currently busy and do not attempt to access the medium if the medium is determined to be busy.

Figure 1A:
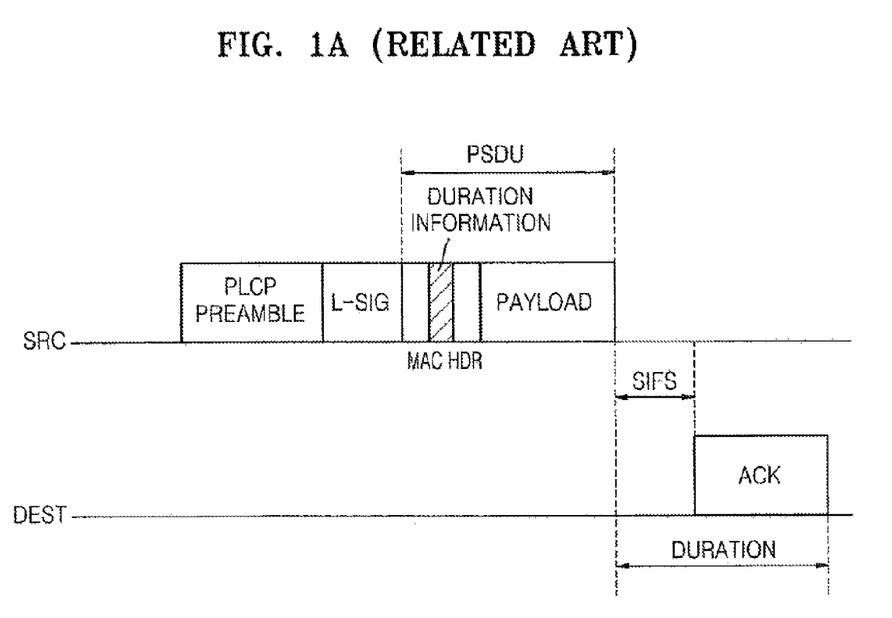
FIGS. 1A and 1B are diagrams illustrating the formats of typical frames preventing a plurality of stations in a WLAN from colliding with each other.

Referring to FIG. 1A, an MAC header of a data frame which can be transmitted via a typical 802.11 WLAN includes duration information which specifies the time required to receive an acknowledgement (ACK) frame in return for the data frame after the transmission of the data frame. A plurality of stations which receive the data frame interpret the MAC header of the data frame and do not attempt to access a medium during a predetermined time period specified in the MAC header of the data frame. Therefore, the stations can be prevented from colliding with each other. Due to the characteristics of a WLAN, all of a plurality of stations in a WLAN can hear frames regardless of whether the frames are destined for only one of the stations.

Figure 1B:
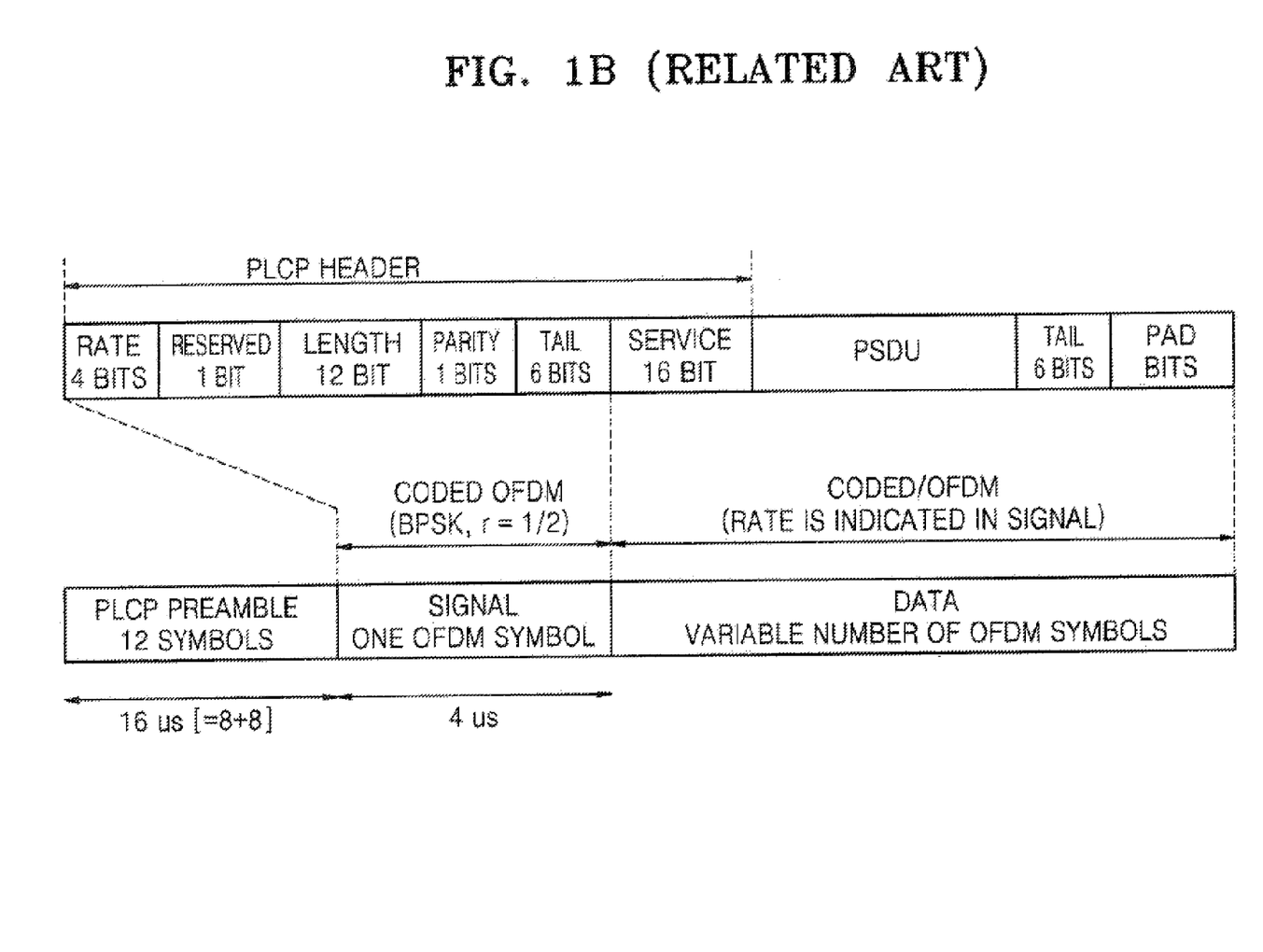

FIG. 1B is a diagram illustrating the format of a data frame which is used in a typical 802.11a network. Referring to FIG. 1B, a signal field of the 802.11a frame includes rate information (RATE) and length information (LENGTH). Thus, duration information of the data frame can be obtained by analyzing the rate information and the length information of the data frame. Therefore, the virtual carrier sensing method can be realized.

The virtual carrier sensing method can be effectively applied to CSMA/CA only when an MPDU/PHY service data unit (PSDU) can be interpreted properly without any errors, i.e., only when the value of an MAC header of a frame can be read out properly.

When errors occur due to an unstable channel state during the transmission of a frame at a high transmission rate by a transmitting station, or when a receiving station cannot properly handle the high transmission rate, a received MPDU/PSDU cannot be interpreted properly. In this case, virtual carrier sensing cannot be used, and thus, the performance of CSMA/CA decreases. Therefore, when a sending station transmits a data frame having a high throughput (HT) format in a WLAN where a plurality of 802.11a/b/g legacy stations and a plurality of HT stations such as multi-input multi-output (MIMO) stations which have better data transmission capabilities than the 802.11a/b/g legacy stations coexist, the 802.11a/b/g legacy stations cannot perform a virtual carrier sensing operation because they cannot interpret a frame which has the HT format. This problem also arises when some of the HT stations in the WLAN use channel bonding and thus use channel bandwidths which are different from the other HT stations.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for preventing a plurality of stations in a WLAN from colliding with each other when attempting to access a medium in which a medium access method to prevent the stations from colliding with each other is adaptively chosen in consideration of the transmission capabilities of the stations and the stations are notified of the adaptively chosen method.

According to an aspect of the present invention, there is provided a method of preventing a plurality of stations in a WLAN from colliding with each other when attempting to access a medium. The method includes determining the transmission capabilities of the plurality of stations; determining the structure of frames to be used in the WLAN according to a result of the determining the transmission capabilities of the plurality of stations; and transmitting a result of the determining the structure of frames to be used in the WLAN.

If the result of the determining the transmission capabilities of the plurality of stations indicates that an HT station and legacy station coexist in the WLAN or that at least two HT stations which use channel bandwidths which are different from each other coexist in the WLAN, the determining the structure of frames to be used in the WLAN may include determining that a data frame which has an HT format should contain time information which indicates how long a plurality of stations in the WLAN, other than a sending station which transmits the data frame and a destination station to which the data frame is to be transmitted, must wait and refrain from attempting to access the medium, in a physical layer (PHY) header which is of the data frame and has a legacy format.

If the results of the determining the transmission capabilities of the plurality of stations indicate that an HT station and a legacy station coexist in the WLAN or that at least two HT stations which use channel bandwidths which are different from each other coexist in the WLAN, the determining the structure of frames to be used in the WLAN may include determining that a control frame used in the WLAN should have a legacy format.

The control frame may include at least one of an ACK frame, a request-to-send (RTS) frame, and a clear-to-send (CTS) frame.

Determining the transmission capabilities of the plurality of stations may include determining the transmission capabilities of the stations with reference to a plurality of association request frames respectively transmitted by the stations.

Transmitting a result of the determining the structure of frames to be used in the WLAN may include transmitting the results of determining the structure of frames to be used in the WLAN to the stations by using a beacon frame or a probe response frame.

According to another aspect of the present invention, there is provided a computer-readable recording medium which stores a computer program for executing the method.

According to another aspect of the present invention, there is provided an apparatus which prevents a plurality of stations in a wireless local area network (WLAN) from colliding with each other when attempting to access a medium. The apparatus includes a determination unit which determines the transmission capabilities of the stations; a decision unit which determines the structure of frames to be used in the WLAN according to the result of the determination performed by the determination unit; and a transmission unit which transmits the result of the determination performed by the decision unit.

If the results of the determination performed by the determination unit indicate that a HT station and legacy station coexist in the WLAN or that at least two HT stations which use channel bandwidths which are different from each other coexist in the WLAN, the decision unit may decide that a data frame which has an HT format should contain time information which indicates how long a plurality of stations in the WLAN, other than a sending station which transmits the data frame and a destination station to which the data frame is to be transmitted, must wait and refrain from attempting to access the medium in a physical layer (PHY) header which is in the data frame and has a legacy format.

If the result of the determination performed by the determination unit indicate that an HT station and a legacy station coexist in the WLAN or that at least two HT stations which use channel bandwidths which are different from each other coexist in the WLAN, the decision unit may decide that a control frame used in the WLAN should have a legacy format.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 2:
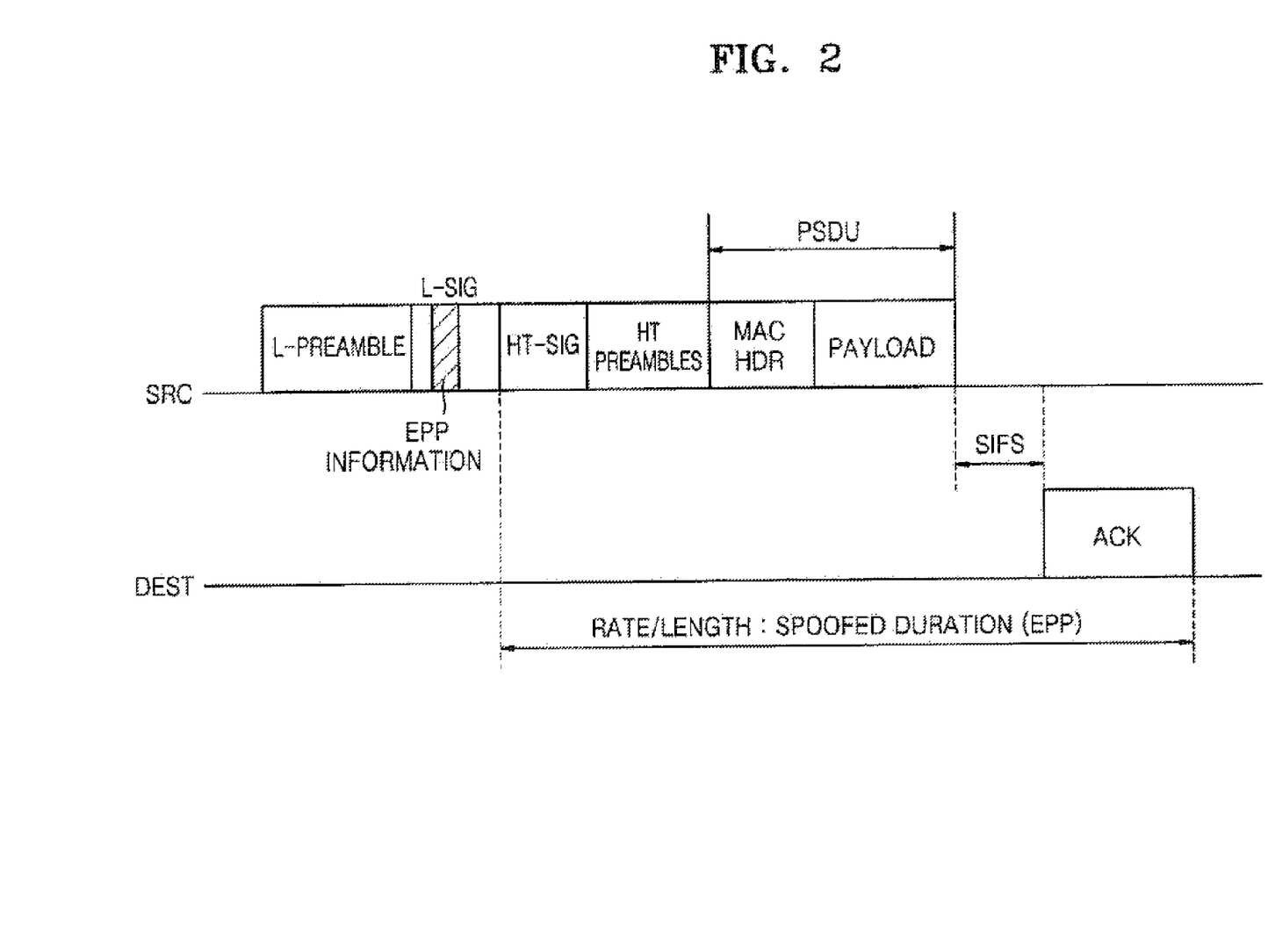
FIG. 2 is a diagram illustrating the format of a data frame according to an exemplary embodiment of the present invention which is used to prevent a plurality of stations in a WLAN, where a plurality of HT stations and a plurality of legacy stations coexist from colliding with each other when accessing a medium.

FIG. 2 is a diagram illustrating the format of a data frame according to an exemplary embodiment of the present invention which is used to prevent a plurality of stations in a WLAN, where a plurality of HT stations and a plurality of legacy stations coexist, from colliding with each other when accessing a medium.

In order to solve the aforementioned problem with the related art in that the CSMA/CA mechanism is highly likely to end up with errors when a plurality of stations which have different transmission capabilities from each other coexist, a method based on the IEEE 802.11n standard whose standardization is under way has been suggested in which a physical layer (PHY) header which have a legacy format (L-Preamble, L-SIG) is attached to a data frame which has an HT format such that the data frame can be interpreted by legacy stations and duration information which is previously included in an existing MAC header and indicates the time taken to receive an acknowledgement (ACK) frame in return for a data frame is included in the PHY header. The duration information will now be referred to as extended PHY protection (EPP) information.

When an HT station transmits a data frame having such a format, a plurality of legacy stations which receive the data frame interpret EPP information included in an L-SIG header of the data frame and refrain from attempting to access a medium until the transmission of an ACK frame is concluded. Thus, the legacy stations can be prevented from colliding with each other.

Figure 3:
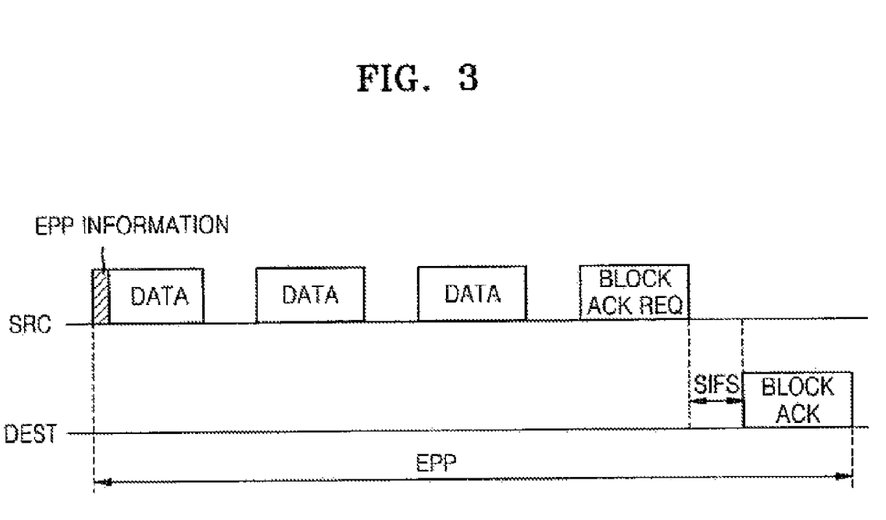
FIG. 3 is a diagram illustrating a method of preventing a plurality of stations in a WLAN from colliding with each other when accessing a medium by using extended physical layer (PHY) protection (EPP) information according to an exemplary embodiment of the present invention in a sequence where a block acknowledgement (ACK) frame is used.

FIG. 3 is a diagram illustrating a method of preventing a plurality of stations in a WLAN from colliding with each other when accessing a medium by using EPP information according to an exemplary embodiment of the present invention in a sequence where a block ACK frame is used.

In general, a sending station transmits one data frame, and a receiving station transmits an ACK frame in return for the data frame. However, when a sending station transmits a plurality of data frames, as illustrated in FIG. 3, and issues a request for information indicating whether each of the plurality of data frames has been successfully received by a receiving station, the receiving station may transmit a block ACK frame in return for all of the plurality of transmitted data frames which indicates that all of the plurality of transmitted data frames have been successfully received by the receiving station. In this case, EPP information indicating when the transmission of a block ACK request frame will be concluded may be included in a PHY header which is in the first data frame of the plurality of data frames and has a legacy format.

Figure 4:
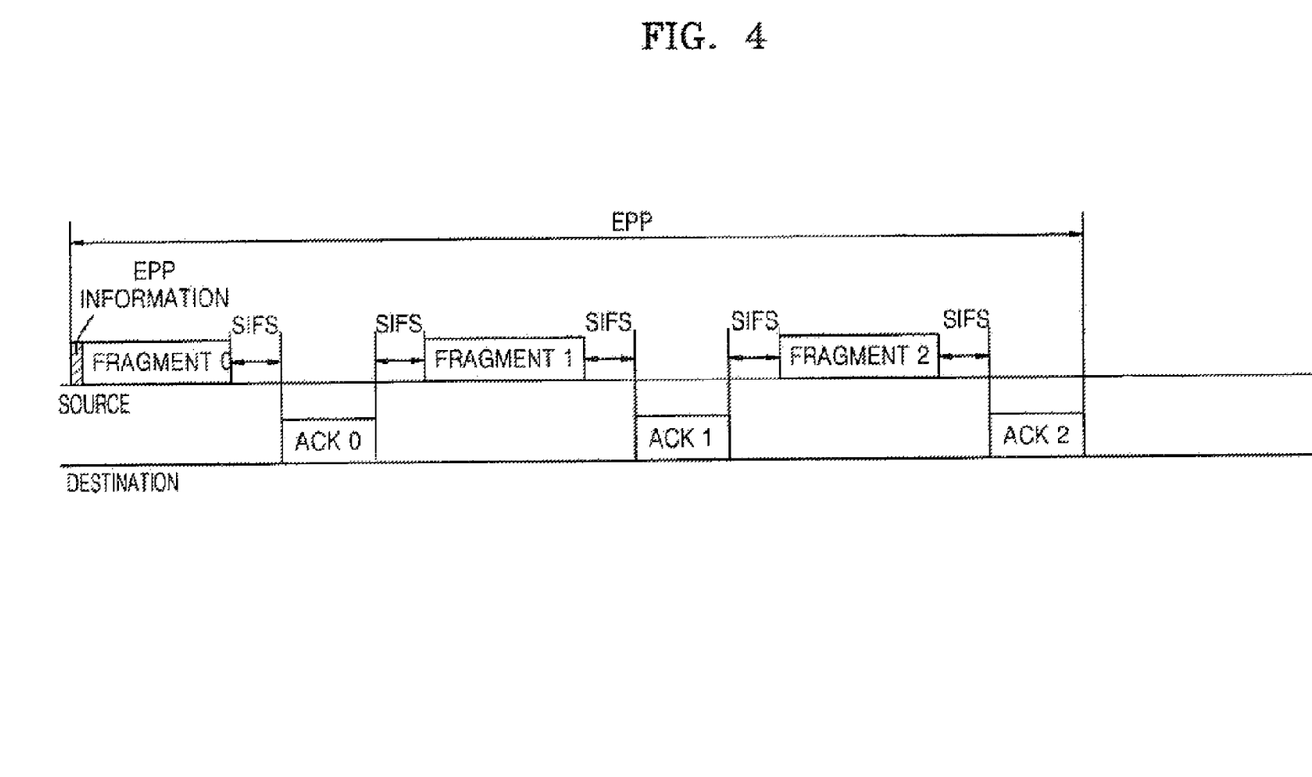
FIG. 4 is a diagram illustrating a method of preventing a plurality of stations in a WLAN from colliding with each other when attempting to access a medium by using EPP information according to an exemplary embodiment of the present invention in a sequence where a sending station transmits a plurality of fragment frames.

FIG. 4 is a diagram illustrating a method of preventing a plurality of stations from colliding with each other when accessing a medium by using EPP information according to an exemplary embodiment of the present invention in a sequence where a sending station transmits a plurality of fragment frames. Referring to FIG. 4, if a sending station divides a single data frame into three fragment frames, i.e., first through third fragment frames, and transmits the first through third fragment frames, a receiving station may respectively transmit first through third ACK frames for the first through third fragment frames. In this case, EPP information may be included in a PHY header which is of the first fragment frame and has a legacy format, and a legacy station which has received the first fragment frame interprets the EPP information and refrains from attempting to access a medium until the transmission of the third ACK frame in return for the third fragment frame is concluded.

In a WLAN where a plurality of stations having different transmission capabilities from each other coexist, as illustrated in FIGS. 2 through 4, the stations can be prevented from colliding with each other when accessing a medium by using a control frame, instead of EPP information. A method of preventing a plurality of stations from colliding with each other when accessing a medium by using a control frame according to an exemplary embodiment of the present invention will now be described in detail.

Figure 5:
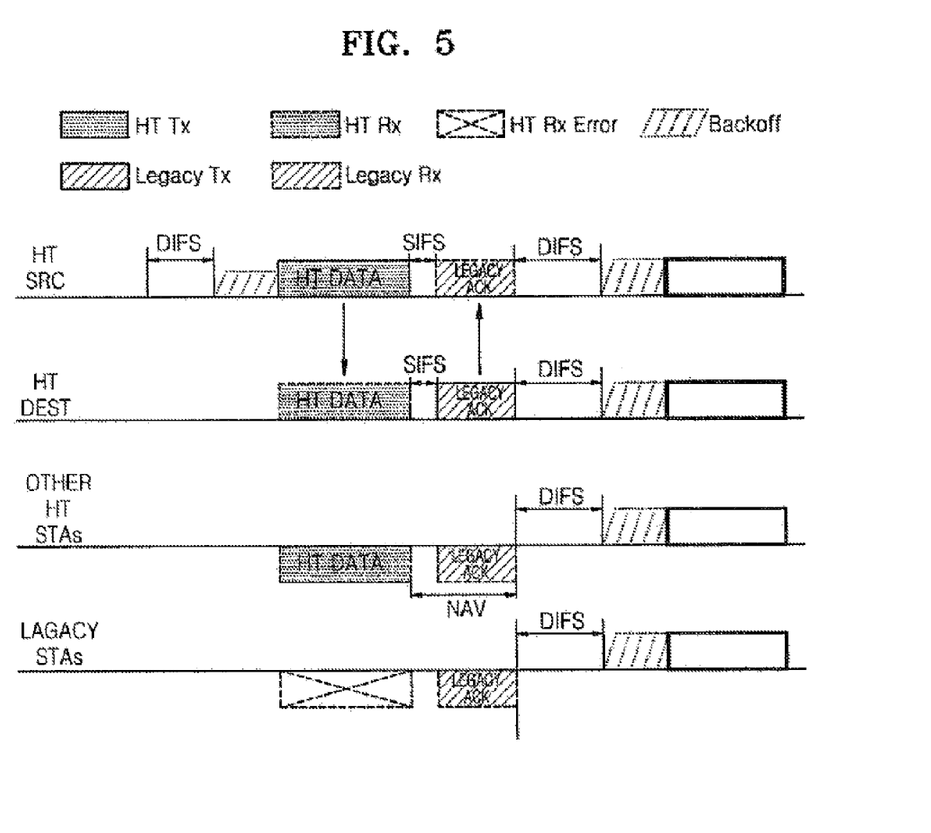
FIG. 5 is a diagram illustrating a method of preventing a plurality of stations in a WLAN from colliding with each other when attempting to access a medium by using an ACK frame which has a legacy format according to an exemplary embodiment of the present invention.

FIG. 5 is a diagram illustrating a method of preventing a plurality of stations from colliding with each other when accessing a medium by using an ACK frame which has a legacy format according to an exemplary embodiment of the present invention. Referring to FIG. 5, when a sending HT station transmits a data frame which has an HT format, a plurality of receiving HT stations which receive the data frame can set a network allocation vector (NAV) with reference to the value of a duration field of the data frame. As described above, legacy stations cannot interpret the value of a duration field of an MAC header of a data frame which has the HT format and thus cannot set an NAV to the same value as an NAV of HT stations. However, this problem can be addressed by allowing a station which has also received the data frame having the HT format to transmit an ACK frame which has a legacy format. In other words, since legacy stations cannot interpret a data frame which has the HT format, they cannot learn when the transmission of an ACK frame will be concluded. However, when the legacy stations receive an ACK frame having a legacy format, they readily start to count a distributed coordination function (DCF) interframe space (DIFS) in the same manner as HT stations do, as illustrated in FIG. 5. Therefore, even when a plurality of stations which have different transmission capabilities from each other coexist in a WLAN, it is possible to prevent the stations from colliding with each other when accessing a medium and make a plurality of HT stations and a plurality of legacy stations participate fairly when competing for access to the medium by using an ACK frame which has a legacy format.

Figure 6:
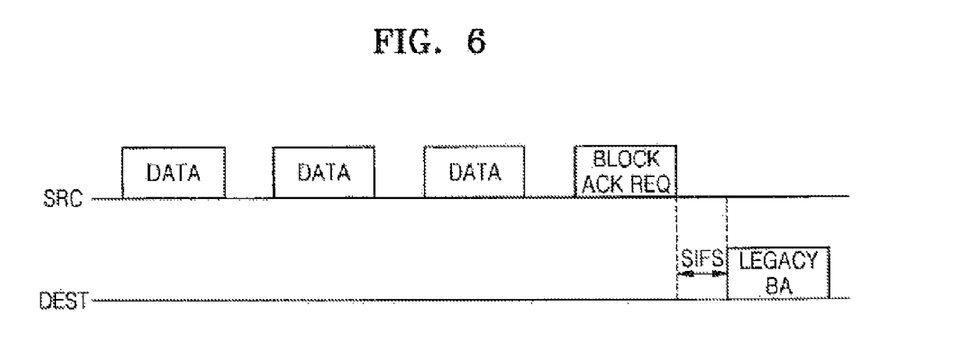
FIG. 6 is a diagram illustrating a method of preventing a plurality of stations in a WLAN from colliding with each other when attempting to access a medium by using a block ACK frame which has a legacy format according to an exemplary embodiment of the present invention.

FIG. 6 is a diagram illustrating a method of preventing a plurality of stations from colliding with each other when accessing a medium by using an ACK frame which has a legacy format according to an exemplary embodiment of the present invention in a sequence where a block ACK frame is used. In general, a sending station transmits one data frame, and a receiving station transmits an ACK frame in return for the data frame. However, when a sending station transmits a plurality of data frames, as illustrated in FIG. 6, and issues a request for information indicating whether each of the plurality of data frames has been successfully received by a receiving station, the receiving station may transmit a block ACK frame in return for the plurality of data frames to indicate that all of the plurality of data frames have been successfully received by the receiving station. In this case, if the block ACK frame has a legacy format, it is possible to obtain the effect of using the method illustrated in FIG. 5, i.e., it is possible to prevent a plurality of stations from colliding with each other when accessing a medium and make a plurality of HT stations and a plurality of legacy stations compete fairly when contending for access to the medium by using an ACK frame, as illustrated in FIG. 5.

Figure 7:
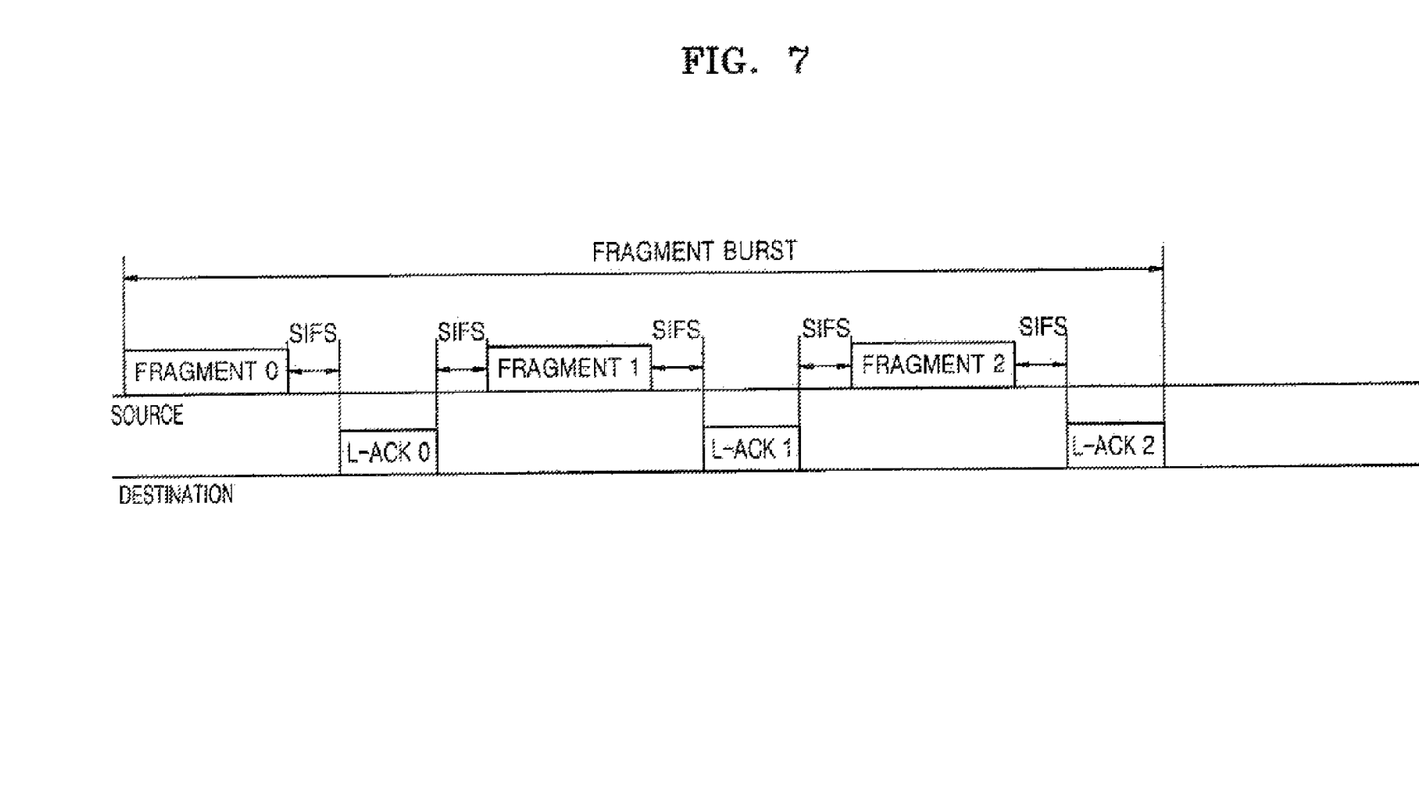
FIG. 7 is a diagram illustrating a method of preventing a plurality of stations in a WLAN from colliding with each other when attempting to access a medium by using an ACK frame which has a legacy format according to an exemplary embodiment of the present invention in a sequence where a sending station transmits a plurality of fragment frames.

FIG. 7 is a diagram illustrating a method of preventing a plurality of stations from colliding with each other when accessing a medium by using an ACK frame which has a legacy format according to an exemplary embodiment of the present invention in a sequence where a sending station transmits a plurality of fragment frames. Referring to FIG. 7, a sending station divides a single data frame into three fragment frames, i.e., first through third fragment frames, and transmits the first through third fragment frames. In the present exemplary embodiment, unlike in the previous exemplary embodiment illustrated in FIG. 6, a receiving station respectively transmits first through third ACK frames for the first through third data fragment frames. Accordingly, it is possible to obtain the effect of using the method illustrated in FIG. 5 by using the method illustrated in FIG. 7.

Various methods of preventing a plurality of stations from colliding with each other when accessing a medium by using an ACK frame according to exemplary embodiments of the present invention have been described above with reference to FIGS. 5 through 7. A method of preventing a plurality of stations from colliding with each other when accessing a medium by using a request-to-send (RTS) frame and a clear-to-send (CTS) frame which have a legacy format according to an exemplary embodiment of the present invention will now be described in detail with reference to FIG. 8.

Figure 8:
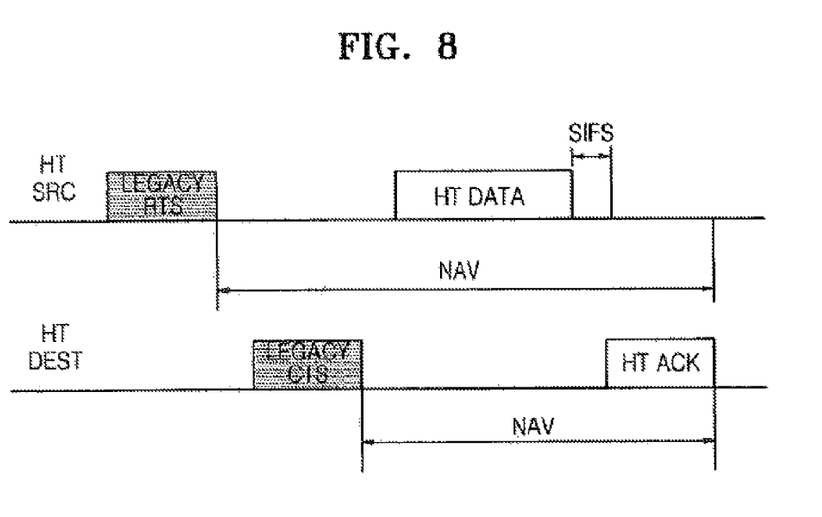
FIG. 8 is a diagram illustrating a method of preventing a plurality of stations in a WLAN from colliding with each other when attempting to access a medium by using a request-to-send (RTS) frame and a clear-to-send frame having a legacy format according to an exemplary embodiment of the present invention.

FIG. 8 is a diagram illustrating a method of preventing a plurality of stations from colliding with each other when accessing a medium by using an RTS frame and a CTS frame which have a legacy format according to an exemplary embodiment of the present invention.

An RTS frame is a frame which is transmitted by a sending station ahead of a data frame in order to prevent other stations from attempting to access a medium. An RTS frame includes information which indicates the time taken to execute an exchange sequence for the RTS frame. Thus, a plurality of stations which receive an RTS frame refrain from attempting to access a medium during a time period specified in the RTS frame. A CTS frame is a frame which is transmitted by a receiving station which has received an RTS frame. A CTS frame, like an RTS frame, includes information indicating the time taken to execute an exchange sequence for the CTS frame. Thus, a plurality of stations which receive a CTS frame refrain from attempting to access a medium during a predetermined time period specified in the CTS frame.

Legacy frames cannot interpret an RTS frame and a CTS frame which have an HT format. Therefore, according to the current exemplary embodiment of the present invention, an RTS frame and a CTS frame which have a legacy format are used. Thus, even when a data frame which has the HT format and an ACK frame which has the HT format are transmitted between a sending station and a receiving station, legacy stations can set an NAV to the same value as an NAV of HT stations by interpreting an RTS frame and a CTS frame transmitted ahead of the data frame and the ACK frame. Accordingly, it is possible to prevent a plurality of stations which have different transmission capabilities from each other from colliding with each other when accessing a medium.

Two different methods of preventing a plurality of stations which have different transmission capabilities from each other from colliding with each other in a WLAN when accessing a medium, i.e., a method which involves the use of a data frame which includes EPP information and a method which involves the use of a legacy control frame, have been described in detail. A mechanism in which one of the two different methods is chosen in consideration of the transmission capabilities of a plurality of stations in a WLAN and the chosen method is performed will now be described in detail. This mechanism may be performed by an access point (AP). An AP determines the transmission capabilities of a plurality of stations in a WLAN, and particularly, a basic service set (BSS) of the AP, chooses one of the two different methods based on the results of the determination, and notifies the stations of the chosen method. In order to determine the transmission capabilities of a plurality of stations in a WLAN, an AP may reference an association request frame which is transmitted by each of the stations to associate with a BSS of the AP.

Figure 9:
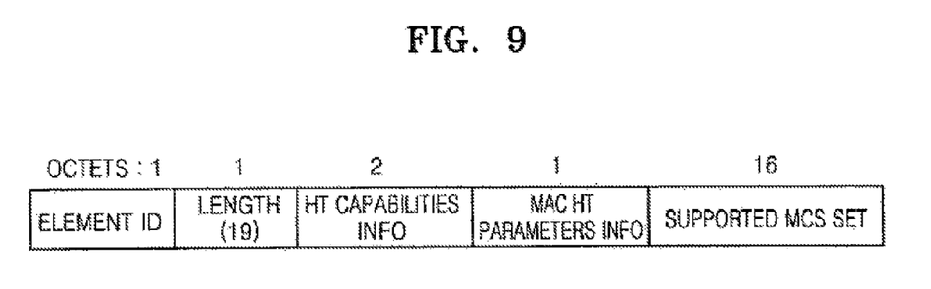
FIG. 9 is a diagram illustrating the format of an element of an association request frame transmitted from a station to an access point (AP), the element including information regarding the transmission capability of the station.

FIG. 9 is a diagram illustrating the format of an element of an association request frame which is transmitted from a station to an AP, the element including information regarding the transmission capability of the station. Referring to FIG. 9, an element of an association request frame transmitted by an HT station includes an HT capabilities information field. An AP determines a station which has transmitted an association request frame to the AP to be a legacy station if the association request frame does not have an HT capabilities information field and determines the station to be an HT station if the association request frame includes an HT capabilities information field.

An HT capabilities information field may store various values regarding the characteristics of an HT station, including the channel bandwidth of the HT station. A plurality of HT stations may have different transmission capabilities even when they are of the same type. For example, an HT station using a bandwidth of 20 MHz and an HT station using a bandwidth of 40 MHz may coexist in a WLAN. In this case, the HT station using a bandwidth of 20 MHz cannot precisely interpret a frame transmitted by the HT station using a bandwidth of 40 MHz and thus may collide with the HT station using a bandwidth of 40 MHz when attempting to access a medium. Therefore, there is the need to use one of the two methods presented in the previous exemplary embodiments of the present invention, i.e., a method which involves the use of a data frame which includes EPP information and a method which involves the use of a legacy control frame, when a plurality of HT stations which have different transmission capabilities from each other coexist in a WLAN as well as when a plurality of HT stations and a plurality of legacy stations coexist in a WLAN.

Referring to FIG. 9, an HT capabilities information field of an association request frame transmitted by an HT station may include information which indicates whether the HT station can interpret and apply EPP information, i.e., information which indicates whether the HT station supports an EPP mechanism, as well as channel bandwidth information of the HT station.

Therefore, an AP adaptively chooses one of the two methods described in the previous exemplary embodiments of the present invention according to the types of stations in a WLAN by referencing the HT capabilities information fields of a plurality of association request frames respectively transmitted by the stations.

Figure 10:
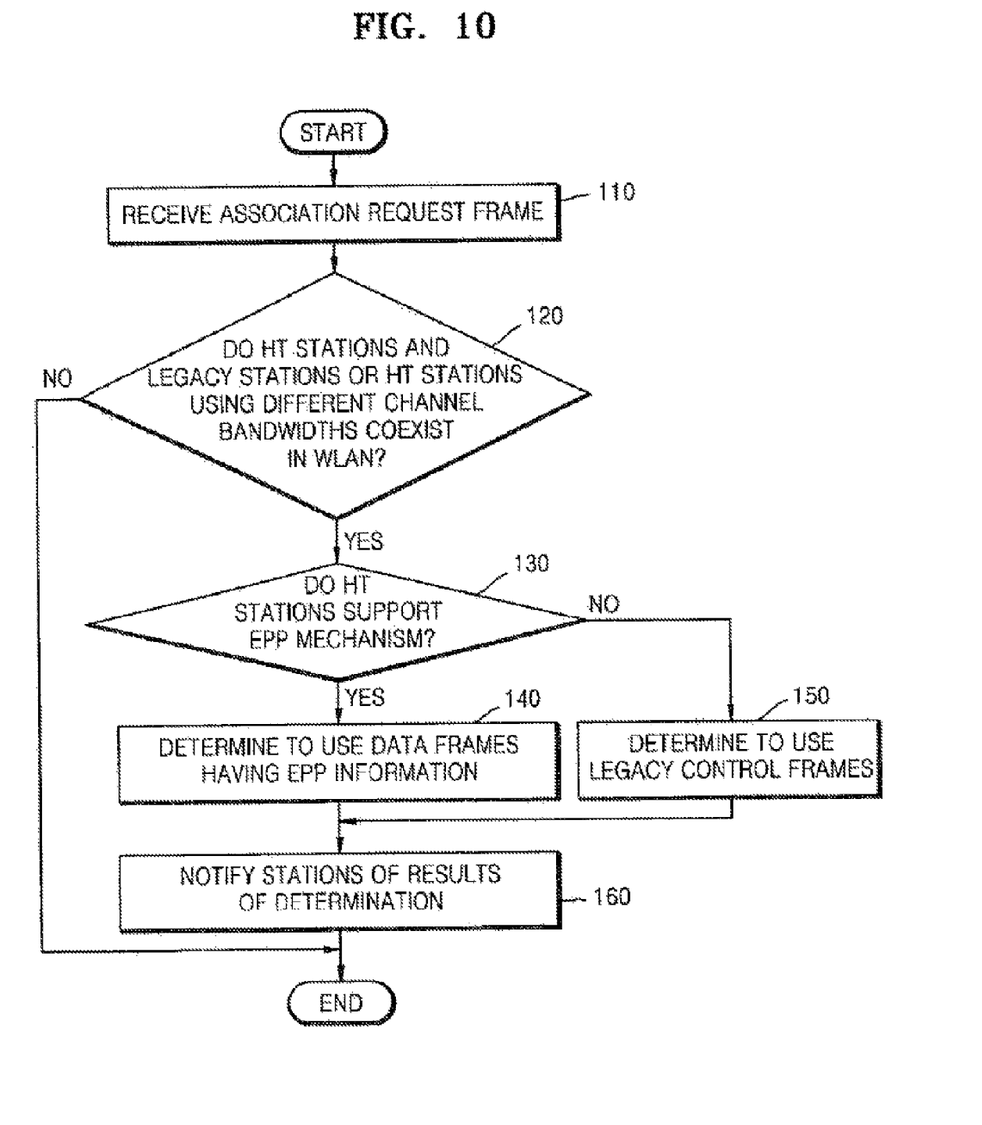
FIG. 10 is a flowchart illustrating a method of choosing one of a plurality of methods of preventing a plurality of stations in a WLAN from colliding with each other when accessing a medium and using the chosen method to prevent a plurality of stations in a WLAN from colliding with each other when accessing a medium according to an exemplary embodiment of the present invention.

FIG. 10 is a flowchart illustrating a method of choosing one of a method of preventing a plurality of stations in a WLAN from colliding with each other when accessing a medium which involves the use of data frames which have EPP information and a method of preventing a plurality of stations in a WLAN from colliding with each other when accessing a medium which involves the use of legacy control frames according to an exemplary embodiment of the present invention. Referring to FIG. 10, in operation 110, an AP receives a plurality of association request frames respectively transmitted by a plurality of stations in a BSS of the AP. In operation 120, the AP determines the transmission capabilities of the stations. In detail, in operation 120, the AP determines whether a plurality of HT stations and a plurality of legacy stations coexist in the BSS of the AP or whether a plurality of HT stations which use different channel bandwidths from each other coexist in the BSS of the AP. If all the stations in the BSS of the AP have the same transmission capabilities, there is no need to use any method to prevent the stations from colliding with each other when accessing a medium.

However, if a plurality of HT stations and a plurality of legacy stations coexist in the BSS of the AP, or if a plurality of HT stations using different channel bandwidths from each other coexist in the BSS of the AP, the AP needs to determine whether all the HT stations in the BSS of the AP can interpret and apply EPP information, i.e., whether all the HT stations in the BSS of the AP support the EPP mechanism, by referencing the HT capabilities information fields of a plurality of association request frames respectively transmitted by the HT stations in the BSS of the AP. In operation 140, if all the HT stations in the BSS of the AP support the EPP mechanism, the AP determines to use a data frame which contains EPP information in a PHY header which has a legacy format. Thereafter, in operation 160, the AP notifies all the stations in the BSS of the AP of the results of the determination performed in operation 140.

On the other hand, in operation 150, if at least one of the HT stations in the BSS of the AP does not support the EPP mechanism, the AP determines to use control frames which have a legacy format in subsequent transmissions. Thereafter, in operation 160, the AP notifies all the stations in the BSS of the AP of the results of the determination performed in operation 150. Here, the control frames may include at least one of an ACK frame, an RTS frame, and a CTS frame.

The AP may notify the stations in the BSS of the AP of the results of the determination performed in operation 140 or 150, i.e., the type of data frames or control frames to be used in subsequent transmissions, by using a beacon frame. For example, the AP may notify the stations in the BSS of the AP of the transmission capabilities of all of the stations in the BSS of the AP by generating a beacon frame which has an operating mode field, and setting the operating mode field to a predetermined value. The AP may also notify the stations in the BSS of the AP whether the stations in the BSS of the AP support the EPP mechanism by generating a beacon frame which has an EPP mechanism field and setting the EPP mechanism field to a predetermined value.

Accordingly, when a beacon frame transmitted by the AP is received, the stations in the BSS of the AP may interpret an operating mode of the beacon frame and determine whether to use a method of preventing a plurality of stations in a WLAN from colliding with each other when accessing a medium based on the results of the interpretation of the operating mode field.

If the stations in the BSS of the AP decide to use a method of preventing a plurality of stations in a WLAN from colliding with each other when accessing a medium, they may interpret an EPP mechanism field of the beacon frame and determine whether to use the method which involves the use of data frames which include EPP information or the method which involves the use of legacy control frames based on the results of the interpretation of the EPP mechanism field. Alternatively, the AP may notify the stations in the BSS of the AP of the results of the determination performed in operation 140 or 150 by using a probe response frame, instead of using a beacon frame.

Figure 11:
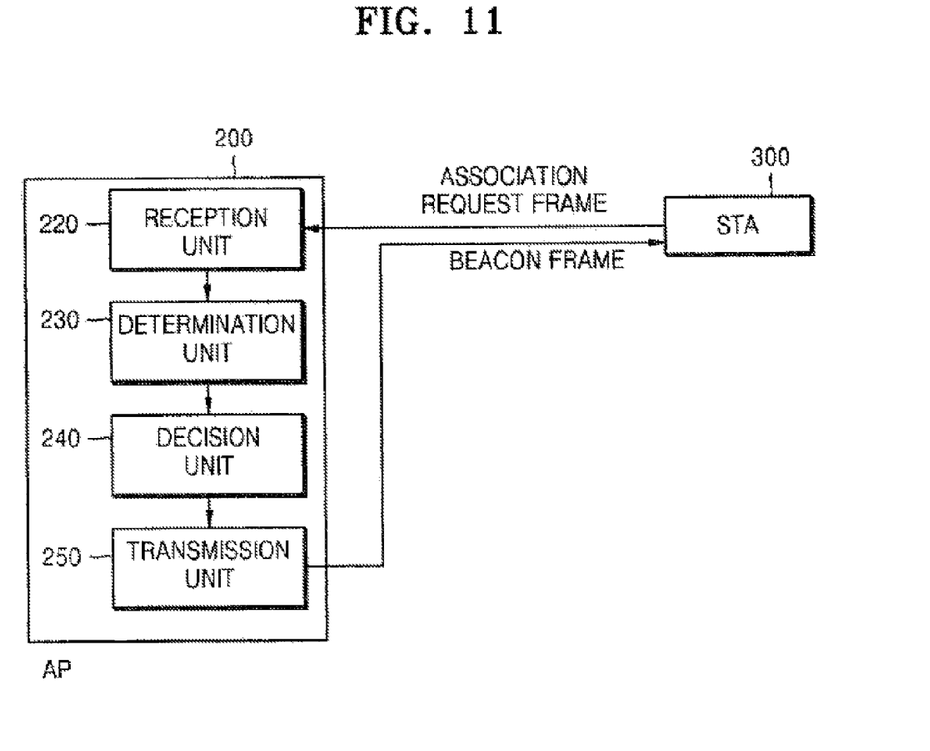
FIG. 11 is a block diagram of an apparatus for preventing a plurality of stations in a WLAN from colliding with each other when accessing a medium and which chooses one of a plurality of methods of preventing a plurality of stations in a WLAN from colliding with each other when accessing a medium and notifies a plurality of stations in the WLAN of the chosen method, according to an exemplary embodiment of the present invention.

FIG. 11 is a block diagram of an AP 200 according to an exemplary embodiment of the present invention which chooses one of a plurality of methods of preventing a plurality of stations in a WLAN from colliding with each other when accessing a medium and notifies a plurality of stations in the WLAN of the chosen method. Referring to FIG. 11, the AP 200 includes a reception unit 220, a determination unit 230, a decision unit 240, and a transmission unit 250. The reception unit 220 receives an association request frame transmitted by an arbitrary station 300 and transmits the association request frame to the determination unit 230. The determination unit 230 determines a method of preventing a plurality of stations in a WLAN from colliding with each other when accessing a medium, the format of data frames, and the format of control frames to be used in a BSS of the AP 200. The determination unit 230 determines whether the arbitrary station 300 is an HT station or a legacy station by determining whether the association request frame includes an HT capabilities information field. Thereafter, if the association request frame is determined to include an HT capabilities information field, the determination unit 230 determines whether one or more HT stations which use different channel bandwidths from the arbitrary station 300 also exist in the BSS of the AP 200 by referencing the value of the HT capabilities information field of the association request frame.

The decision unit 240 decides whether to use a method which involves the use of an HT data frame containing EPP information or a method which involves the use of a control frame having a legacy format. If a plurality of stations in the BSS of the AP 200 have the same transmission capabilities, a method of preventing a plurality of stations in a WLAN from colliding with each other when accessing a medium may be unnecessary. However, if a plurality of HT stations and a plurality of legacy stations coexist in the BSS of the AP 200 or if a plurality of HT stations which use channel bandwidths which are different from each other coexist in the BSS of the AP 200, the decision unit 240 determines whether all of the HT stations in the BSS of the AP 200 support the EPP mechanism.

If at least one of the HT stations in the BSS of the AP 200 does not support the EPP mechanism, the decision unit 240 decides to use the method which involves the use of control frames which have a legacy format in subsequent transmissions. On the other hand, if all the HT stations in the BSS of the AP 200 support the EPP mechanism, the decision unit 240 decides to generate a data frame which has the HT format in subsequent transmissions by inserting EPP information into a PHY header which has a legacy format. The transmission unit 250 transmits a beacon frame or a probe response frame which includes the results of the decision performed by the decision unit 240 to the stations in the BSS of the AP 200.

The beacon frame or the probe response frame transmitted by the transmission unit 250 may include information regarding the transmission capabilities of the stations in the BSS of the AP 200. If the BSS of the AP 200 includes a plurality of HT stations, the beacon frame or the probe response frame transmitted by the transmission unit 250 may also include information indicating whether all the HT stations in the BSS of the AP 200 support the EPP mechanism. Accordingly, when receiving the beacon frame or the probe response frame transmitted by the transmission unit 250, the stations in the BSS of the AP 200 can determine the format of data frames or control frames to be used later on based on such information included in the received beacon frame or the received probe response frame.

The exemplary embodiments of the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage.

According to the exemplary embodiments of the present invention, it is possible to prevent a plurality of stations in a WLAN from colliding with each other when attempting to access a medium even when the stations have different transmission capabilities from each other. In addition, according to the exemplary embodiments of the present invention, it is possible to adaptively choose and use an optimum method of preventing a plurality of stations in a WLAN from colliding with each other when accessing a medium according to the circumstances in a WLAN by referencing the transmission capabilities of a plurality of stations in the WLAN.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preventing a plurality of stations in a wireless local area network (WLAN) comprising at least one high throughput (HT) station and at least one legacy station from colliding with each other, the method, which is performed by the at least one HT station, comprising:
   determining whether to apply transmission protection to generate frames by referring to a frame indicating whether all HT stations of the plurality of stations support the transmission protection;
   generating a data frame including a physical layer (PHY) header in a legacy format and data in a high throughput (HT) format,
   the PHY header including a data rate and a length which is used by others of the plurality of stations to determine a period of time when the others of the plurality of stations do not transmit data.

2. The method of claim 1, wherein a period of time remaining in the data frame after a legacy format SIGNAL field (L-SIG) is based on the length divided by the data rate.

3. The method of claim 1, further comprising transmitting an association request frame to an access point, wherein the association request frame contains information on whether the at least one HT station support the transmission protection so that the access point determines whether the all HT stations of the plurality of stations in the WLAN support the transmission protection based on the association request frame.

4. The method of claim 3, wherein the information is included in a HT Capabilities Info field of the association request frame.

5. The method of claim 1, wherein the at least one HT stations is a multi-input multi-output (MIMO) stations.

6. The method of claim 1, wherein the legacy station is an IEEE 802.11a station, an IEEE 802.11b station, or an IEEE 802.11g station.

7. An apparatus comprising:
   at least one processor;
   a memory; and
   a program which is stored in the memory and is executed by the at least one processor to prevent a plurality of stations in a wireless local area network (WLAN) comprising at least one high throughput (HT) station and at least one legacy station from colliding with each other when attempting to access a medium, the program including:
   instructions for determining whether to apply transmission protection to generate frames by referring to a frame indicating whether all HT stations of the plurality of stations support the transmission protection, and
   instructions for generating a data frame including a physical layer (PHY) header in a legacy format and data in a high throughput (HT) format, the PHY header including a data rate and a length which is used by others of the plurality of stations to determine a period of time when the others of the plurality of stations do not transmit data.

8. The apparatus of claim 7, wherein a period of time remaining in the data frame after a legacy format SIGNAL field (L-SIG) is based on the length divided by the data rate.

9. The apparatus of claim 7, wherein the program further comprises instructions for transmitting an association request frame to an access point, wherein the association request frame contains information on whether or not the apparatus supports the transmission protection so that the access point determines whether the all HT stations of the plurality of stations in the WLAN support the transmission protection based on the association request frame.

10. The apparatus of claim 7, wherein the information is included in a HT Capabilities Info field of the association request frame.

11. The apparatus of claim 7, wherein the at least one HT stations is a multi-input multi-output (MIMO) station.

12. The apparatus of claim 7, wherein the legacy station is an IEEE 802.11a station, an IEEE 802.11b station, or an IEEE 802.11g station.

* * * * *